(12) United States Patent
Leth-Olsen et al.

(10) Patent No.: US 6,949,601 B1
(45) Date of Patent: Sep. 27, 2005

(54) SINGLE STAGE SEED POLYMERIZATION FOR THE PRODUCTION OF LARGE POLYMER PARTICLES WITH A NARROW SIZE DISTRIBUTION

(75) Inventors: Kari-Anne Leth-Olsen, Skien (NO); Øystein Paulsen, Brevik (NO); Steinar Pedersen, Skien (NO); Bård Sæthre, Porsgrunn (NO); Rolf Olaf Larsen, Langesund (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 10/070,915

(22) PCT Filed: Sep. 11, 2000

(86) PCT No.: PCT/NO00/00297

§ 371 (c)(1),
(2), (4) Date: Jun. 10, 2002

(87) PCT Pub. No.: WO01/19885

PCT Pub. Date: Mar. 22, 2001

(30) Foreign Application Priority Data

Sep. 13, 1999 (NO) ................................. 19994425

(51) Int. Cl.[7] .............................................. C08F 2/16
(52) U.S. Cl. ....................... 524/458; 524/469; 526/201; 526/203; 526/909
(58) Field of Search .............................. 524/458, 834, 524/460; 525/313; 526/344, 909, 88, 201, 526/203

(56) References Cited

U.S. PATENT DOCUMENTS

| | | |
|---|---|---|
| 4,091,054 A | 5/1978 | Saito et al. |
| 4,694,035 A | 9/1987 | Kasai et al. |
| 4,912,184 A | 3/1990 | Akasaki et al. |
| 5,061,766 A | 10/1991 | Yamashita et al. |
| 6,228,925 B1 * | 5/2001 | Pedersen et al. ............. 524/458 |

FOREIGN PATENT DOCUMENTS

| | | |
|---|---|---|
| EP | 0326383 | 8/1989 |
| EP | 0448391 | 9/1991 |
| EP | 0995764 | 4/2000 |
| WO | 9740076 | 10/1997 |
| WO | 9831714 | 7/1998 |

OTHER PUBLICATIONS

Abstract of JP 01044456 (Feb./1989).
Abstract of JP 02158606 (Jun./1990).
Abstract of JP 64001702 (Jan./1989).

* cited by examiner

Primary Examiner—Tatyana Zalukaeva
(74) Attorney, Agent, or Firm—Wenderoth, Lind & Ponack, L.L.P.

(57) ABSTRACT

The present invention concerns large spherical polymer particles with a narrow size distribution and a procedure for producing such particles. The procedure is characterized in that a seed polymerization is performed in which the start particles have a very high ability to absorb new monomer so that finished particles are obtained after only one stage of polymerization even if the finished particles are to be as large as in the range 10 to 100 $\mu$m. The procedure is also characterized in that, when porous particles are produced, a porous structure can be formed in which the fraction of micropores is insignificant. Another characteristic feature of the procedure is that the size distribution of the finished particles is narrow and in some cases narrower than in the start particles.

13 Claims, 3 Drawing Sheets

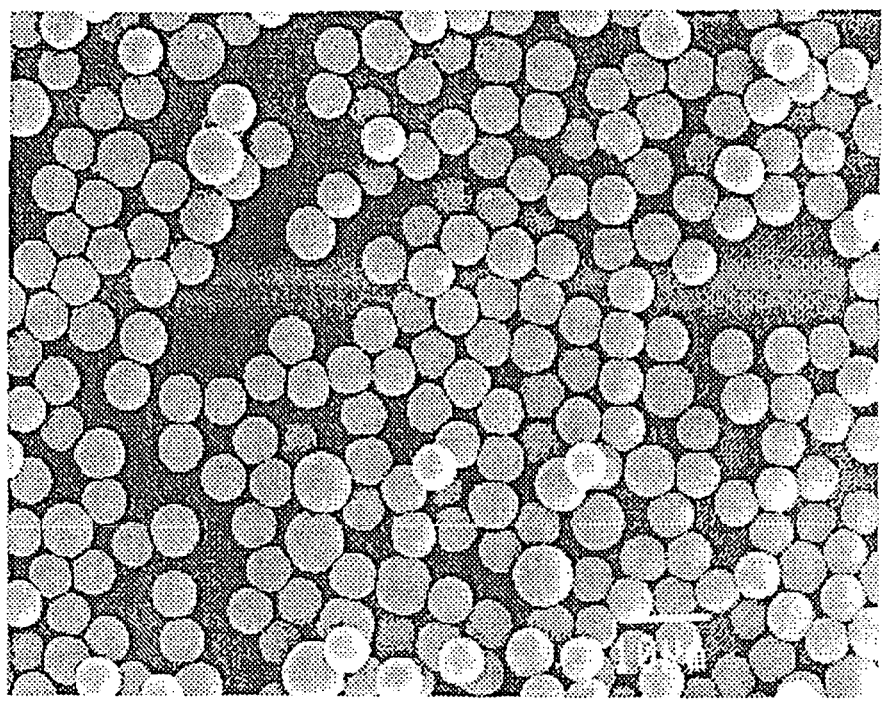
Fig. 1: SEM picture of start particles produced in accordance with example A.1
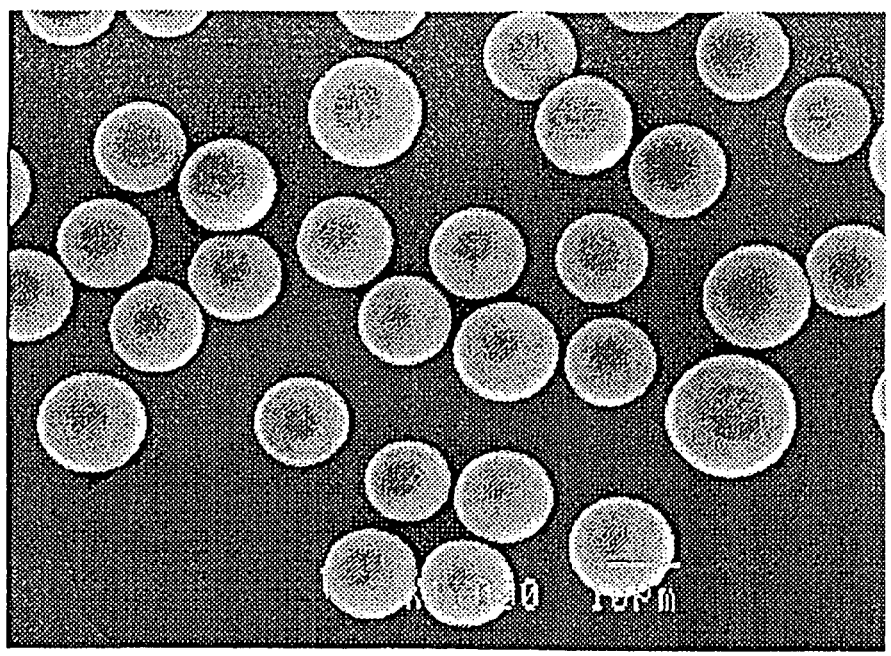
Fig.2: SEM picture of start particles produced in accordance with example A.2

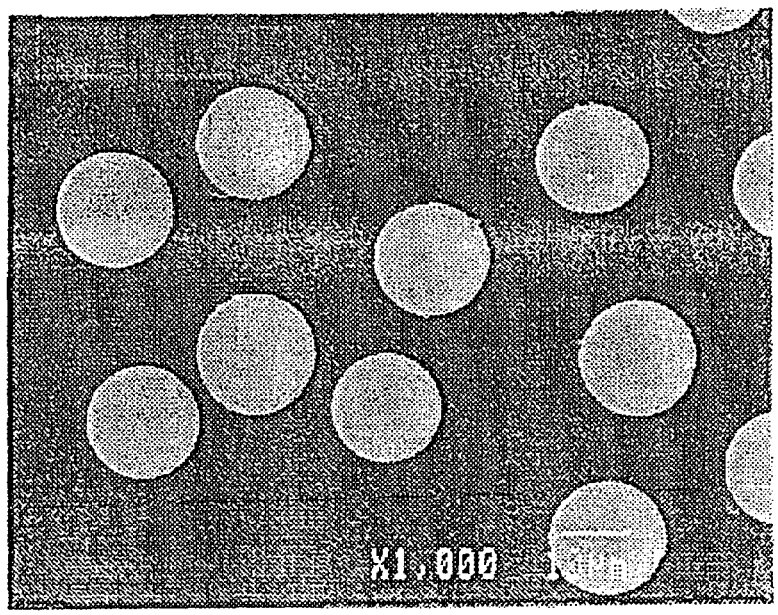
Fig. 3: SEM picture of polymer particles produced in accordance with example B.2
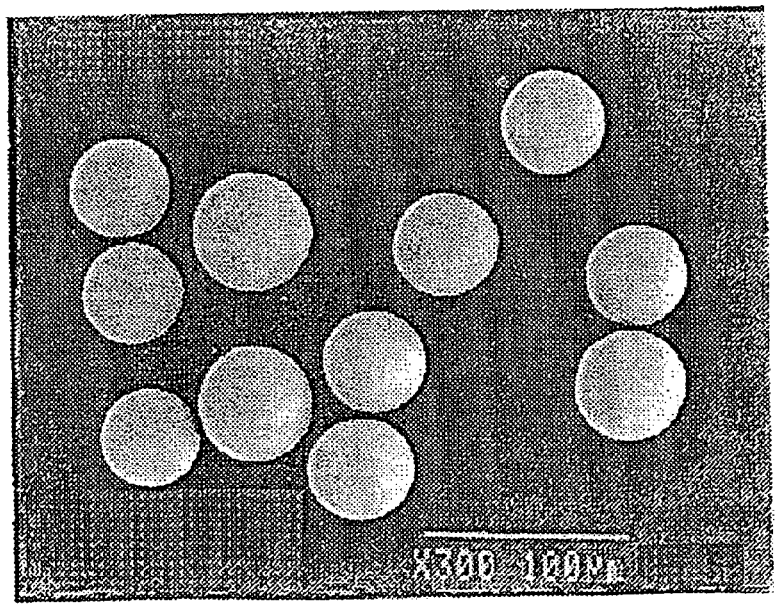
Fig. 4: SEM picture of porous particles produced in accordance with example B.3

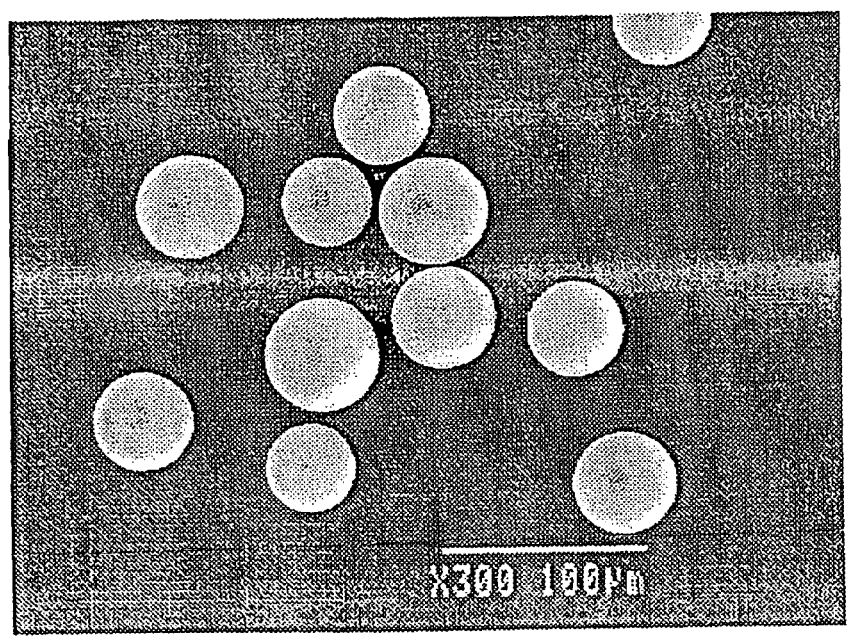
Fig. 5: SEM picture of porous particles produced in accordance with example B.4

US 6,949,601 B1

SINGLE STAGE SEED POLYMERIZATION FOR THE PRODUCTION OF LARGE POLYMER PARTICLES WITH A NARROW SIZE DISTRIBUTION

The present invention concerns large spherical polymer particles with a narrow size distribution and a procedure for producing such particles.

Polymer particles have today many areas of application such as separation, chromatography, adsorbents, ion exchangers, drug-delivery systems, solid-phase peptide synthesis, diagnostics and cosmetic preparations. Each application requires customised properties in the particles. The challenges involve controlling the particle size, the size distribution, the polymer composition, the porosity and the functionality.

Known techniques for the production of polymer particles are suspension polymerisation, emulsion polymerisation, miniemulsion polymerisation, microsuspension polymerisation and dispersion polymerisation. Suspension polymerisation is suitable for making large particles in the size range 0.05 to over 1 mm. The particle size is controlled by agitation and the type and concentration of suspending agents. The technique produces a very wide size distribution, which often limits the application possibilities. It is also difficult to achieve a desired size distribution when particles smaller than 100 $\mu$m are to be produced. With miniemulsion and microsuspension polymerisation, prestabilised emulsion droplets of monomer are used to control the particle size. This also gives a very broad size distribution. With emulsion polymerisation, the particle size is controlled by the quantity and type of surfactants and not by mechanical agitation. This makes it possible to make very narrow size distributions, but the typical maximum particle size is approximately 1 $\mu$m, and it is virtually impossible to make particles over approximately 10 $\mu$m with this technique, which makes it unsuitable for making large polymer particles. Dispersion polymerisation differs from the above technologies in that the process is started in a homogeneous medium in which the monomer is soluble. When polymer is formed, it is precipitated as small particles that grow into the finished particles after the completion of the polymerisation. This process can produce narrow size distributions but in practice the maximum size is limited to approximately 10 $\mu$m. Attempts to produce larger particles have mostly resulted in broad size distributions. Another limitation in this method is the problem of obtaining particles with a high degree of cross-linking. In this system, the introduction of cross-linking produces a wider size distribution and a high probability for the particles to coagulate.

Seed polymerisation is a further development of the methods mentioned above. This technique starts with already polymerised particles, start particles. In principle, start particles can be produced by any method. The start particles are dispersed in the reaction medium and new monomer and initiator are added so that the original particles grow into larger particles in a controlled process. As shown above, it is not, however, easy to produce large polymer particles in the size range 10 to 100 $\mu$m, or particles above 100 $\mu$m with a narrow size distribution. Seed polymerisation is the most appropriate technique for performing this task. However, the method is very limited because the ability of the polymer particles to absorb new monomer is low. The general rule is that new monomer can be absorbed in the ratio 1:1, maximum 5:1, relative to the volume of the start particles.

The absorption of monomer can be described using a thermodynamic swelling equation (Morton equation). The driving force for the diffusion of the monomer into the start particles is the partial molar energy of the mixture of monomer and polymer. However, the particles can only absorb a limited amount of monomer before the equilibrium swelling is achieved. The reason for this is that the swelling leads to an increase in the surface area of the particles and thus to increased surface free energy. This effect, which thus counteracts the swelling, is inversely proportional to the particle radius. The equilibrium swelling of the monomer can be calculated from the expression:

$$\Delta G_m = RT[ln(\phi)_m + (1 - 1/J_p)\phi_p + \phi_p^2 \chi + 2V_m\gamma/rRT] = 0$$

where $\Delta G_m$ is the total partial molar free energy of the mixture, $\phi_m$ and $\phi_p$ are the volume fractions of the monomer and polymer respectively, $J_p$ is the polymer's chain length, $V_m$ is the monomer's partial molar volume, r and $\gamma$ are the particles' radius and interfacial tension and $\chi$ is Flory-Huggin's interaction constant.

The development of polymer particles that have permanent porosity, macroporous particles, is particularly interesting for their use as adsorbents, ion exchangers and chromatography media. It is known that such particles can be obtained by using an inert solvent together with the monomer mixture to be polymerised. It is also known that such solvents can be more or less good as solvents for the polymer formed. A soluble polymer can also be used as a pore forming agent. After the completion of polymerisation, the inert solvent and any soluble polymer are removed and a porous structure is obtained. In order to achieve a permanent porous structure, specific conditions must be present between the polymer formed and the solvent. The typical condition is that a cross-linked polymer is formed and that there is a complete phase separation between the polymer and the solvent. The size distribution of the pores formed is decisive for the area of application of the polymer particles. One known problem is that a considerable fraction of micropores less than 50 Å is formed. These are undesirable in separation processes because small molecules are left in the small pores and lead to poorer separation.

One main objective of the present invention is to produce compact and porous polymer particles and a procedure for producing such particles the above disadvantages. This and other objectives of the present invention are achieved as described in the claims.

The procedure is characterised in that a seed polymerisation is performed in which the start particles have a very high ability to absorb new monomer so that finished particles are obtained after only one polymerisation step even if the finished particles are to be as large as in the range 10 to 100 $\mu$m. The procedure is also characterised in that, when porous particles are produced, a porous structure can be formed in which the fraction of micropores is insignificant. Another characteristic feature of the procedure is that the size distribution of the finished particles is narrow and in some cases narrower than in the start particles.

In order to describe prior art techniques in this field, reference will be made to the following patent specifications: NO 142082, NO 143403, NO 149108, NO 170730, NO 961625 (WO 97/40076), U.S. Pat. No. 4,091,054, EP 0326383, EP 448391, U.S. Pat. No. 4,382,124, EP 0 903 579 A1 and U.S. Pat. No. 5,130,343.

NO 142082 and NO 143403 concern the technique that has become known as the two-step swelling method. The main element of this technique is that a low-molecular compound with very low water solubility is introduced into the start particles in a first stage. This results in an enormous increase in the particles' swelling capacity and much new monomer in relation to the polymer in the start particles can be absorbed and converted into polymer in a second step. The swelling ratio can be increased from 1:1–1:5 to 1:20–1:1000 times. NO 149108 also describes a two-stage swelling process. However, the special element of this method is that more swellable oligomer or oligomer-polymer particles are produced in the first stage. In these particles it is the oligomer content which produces an increased swelling capacity instead of introducing a low-molecular compound with very low water solubility as in NO 142082 and NO 143403. In NO 170730, the disadvantages of these techniques are mentioned as being that they involve several stages to produce polymer particles over 10 µm since the start particles have a size of 0.5 µm.

NO 170730 concerns a process for producing particles in the size range 1 to 30 µm. In this process, start particles which are relatively large are used so that the swelling ratio can be small. Moreover, cross-linked start particles are used to avoid problems with coagulation, fusion and deformation of finished particles. A common feature with the first three references is that a first process stage is used involving the introduction of an activation agent (low-molecular compound with very low water solubility) to facilitate the absorption of new monomer in the second process stage. NO 961625 also uses relatively large start particles produced by dispersion polymerisation. Here, the total swelling ratio is also large, but to obtain spherical particles can be obtained, the majority of the monomer must be introduced during polymerisation.

U.S. Pat. No. 4,091,054 concerns a process which takes place without introducing an activation agent for swelling in a separate step. An initiator solution and a monomer solution are dosed continuously but separately to start particles with a defined size range in such a way that all the polymer is formed within the start particles. Since the monomer is polymerised continuously, the ratio between the monomer and the polymer is always low. This produces controlled but limited growth of the particles.

EP 0326383 discloses a seeded polymerisation wherein the start particles are dispersed in an organic solvent in which also the monomer is dissolved. The organic solvent is miscible with water. The process is characterised in that the solubility of the monomer in the solvent is reduced thereby forcing the monomer into the start particles. Different means of reducing the solubility of the monomer in the solvent are described. It can be done by increasing the water concentration, by reducing the temperature, by adding water via a semipermeable membrane or by reducing the solvent concentration by evaporation.

Obvious disadvantages of this process are the use of large amounts or organic solvent and the need for measures to absorb the monomer into the start particles. The use of organic solvent will also to a large extent limit the versatility of this process to produce porous particles.

EP 448391 discloses a seed polymerisation using iterative steps to increase the particles size to the desired final particle size. Monomer is dosed in a strict controlled manner so the amount of free monomer in the system always is less than 10% of the amount of polymer present at any time during the polymerisation reaction. It is stated that if the amount of free monomer exceeds 10% there will be coagulation problems or there may be new formation of small particles which is highly undesirable. This gives a strong limitation of the process and it will never be possible to swell the polymer more than 1 time its own volume with new monomer. The total increase in diameter that is possible is 10 times. When, in addition, the start particles always are small (less than 2 microns are disclosed) a lot of iterative steps are necessary to achieve particles in the size range 10 to 50 microns.

U.S. Pat. No. 4,382,124 concerns a traditional suspension polymerisation for the production of macroporous polymer particles. It describes how permanent porosity can be introduced into polymer particles. However, no measures are taken to control the size distribution or to prevent the formation of micropores.

EP 0 903 579 A1 uses a technique very similar to that in NO 142082, NO 143403, NO 149108 and NO 170730 with regard to controlling the size and distribution of the particles but also describes new methods for avoiding micropores. This is achieved by introducing, together with the monomer, a compound with conjugated double bonds which does not react with the monomers, or the use of an oxidation-reduction reaction, or heat treatment of the finished particles.

U.S. Pat. No. 5,130,343 also concerns a process similar to that in NO 142082, NO 143403, NO 149108 and NO 170730 with regard to controlling the particle size and distribution. A soluble polymer, which is used as the start particle, is extracted from the finished particle to form a macroporous structure.

In accordance with the present invention, unusual and unexpected results have surprisingly been found when a seed polymerisation is performed in which the start particles are produced by dispersion polymerisation. It is particularly advantageous to use a dispersion polymerisation as described in NO 970247, which patent specification is hereby included as a reference in the present invention. Detailed descriptions of dispersion polymerisation are also provided in K. E. Barret, Br. Polym. J., 5,259, 1973 and E. Shen et al., J of Pol. Sci., 32, 1087, 1994.

The basis for the present invention is an aqueous dispersion of start particles. To this dispersion is then added the monomer mixture which is to be polymerised to form the finished particles. If porous particles are to be produced, the monomer mixture contains one or more pore forming agents. The polymerisation initiator may also be part of the monomer mixture or it may be added separately before or after the addition of the monomer. The volume ratio between the monomer mixture and start particles is always greater than 5:1. This means that the start particles constitute maximum 20% of the product particles and that the increase in particle diameter from start particle to product particle is always greater than 1.8. When the monomer mixture and the initiator are absorbed in the start particles, the polymerisation is performed conventionally at a temperature suitable to the initiator. The product particles are also processed conventionally by dewatering and washing to remove the stabilisers used to prevent flocculation and coagulation during polymerisation, unconverted monomers and initiator and pore forming agents if such agents have been used to make porous particles.

The new, special feature of this procedure is that a large amount of monomer can be absorbed in the start particles without using any form of low-molecular compound with low water solubility as a swelling aid and without the swelling taking place in many stages or by continuous dosing of monomer. The new procedure is thus very simple and is performed in its entirety in just one cycle by the monomer being swelled into the start particles directly in the desired quantity and the polymerisation being performed. The quantity of monomer which can be swelled in may be varied from 5 to more than 100 times the volume of the start particles. From a start particle of, for example, 5 µm, it is possible to produce products with diameters from approximately 9 to approximately 25 µm and from a start particle of, for example, 15 µm, it is possible to produce products with diameters between 25 and 75 µm. There are no restrictions in the procedure with regard to the type of polymerisation additives which may be used.

The types and quantities of emulsifiers, polymer stabilisers, initiators, inhibitors, monomers and solvents can be chosen freely depending on the polymer composition, porosity and particle size to be achieved. Different methods for dosing the monomer mixture may also be chosen. Different monomer mixtures will have different transport velocities through the aqueous phase in which they are added and into the start particles. For monomer systems with low water solubility, it may be advantageous to add the monomer as finely divided droplets, as this increases the transport velocity into the start particles, or partially water-soluble compounds may be added which also increase the transport velocity of the monomer.

Typical monomers used in the monomer mixture are aromatic and aliphatic vinyl monomers such as styrene, vinyl toluene, vinyl pyridine, methyl acrylate, methyl methacrylate, butyl acrylate, butyl methacrylate, phenyl acrylate, phenyl methacrylate, glycidyl methacrylate, hydroxy ethyl methacrylate, methacrylic acid, acrylic acid, acrylamide and cross-linking agents such as divinyl benzene, ethylene glycol dimethacrylate, diallyl phthalate, divinyl pyridine and trivinyl benzene. Emulsifiers and suspension agents are used to keep the particles freely dispersed during the process and possibly also to wet and disperse the start particles. Examples of suitable substances are sodium lauryl sulphate, ammonium laurate, ammonium myristate, sodium dodecyl benzene sulphonate, alkyl sulphonate, sodium lauryl ether sulphate, sodium dihexyl sulphosuccinate, sodium dioctyl sulphosuccinate, fatty alcohol ethoxylate, sorbitan esters, polyvinyl alcohol, polymer cellulose ethers, polyvinyl pyrrolidone, magnesium silicate and calcium phosphate. Common polymerisation initiators such as the peroxides: benzoyl peroxide, lauryl peroxide, tert-butyl perbenzoate, didecanoyl peroxide, dioctanoyl peroxide and cumene hydroperoxide and the azo-initiators: azodiisobutyronitrile, azobismethylbutyronitrile and azobisdimethylvaleronitrile can be used.

Another surprising feature of the procedure is that the product particles have been shown to be completely spherical and free from defects; nor are there any problems with deformation and fusion of particles during the seed polymerisation even though the start particles are a non-cross-linked polymer.

Yet another surprising feature of the procedure is that the size distribution of the product particles is always narrow and in some cases narrower than the distribution of the start particles. This produces special advantages and degrees of freedom with regard to the use of start particles with a relatively broad size distribution even if a relatively narrow size distribution is required for the product. This means that start particles produced by dispersion polymerisation which are above 10 µm and have a relatively broad distribution, as discussed above, are also well suited for the production of particles above 50 µm which are to have a narrow size distribution.

The fact that the size distribution is narrower when a monomer mixture is swelled into start particles produced by dispersion polymerisation with a relatively high diameter and a relatively wide size distribution conflicts with the theory of equilibrium swelling, described above, if it is assumed that the molecular weight and surface conditions are equal for all start particles. The results indicate, therefore, that in a portion with start particles with a moderate size distribution, the smallest start particles will swell more than the largest start particles and the size will be equalised. This is very surprising.

Another surprising feature of the present invention is that the formation of micropores can be reduced considerably. This has not previously been possible without special measures, as described under the description of prior art techniques. One possible explanation is that the non-cross-linked polymer which constitutes the start particles contributes to a different phase separation in the system than when a cross-linked start particle is used.

The present invention will now be described in further detail using examples and figures that in no way restrict the possibilities of the present invention.

DESCRIPTION OF FIGURES

FIG. 1 shows a picture of the start particles from example A.1.

FIG. 2 shows a picture of the start particles from example A.2.

FIG. 3 shows a picture of the porous spherical polymer particles produced in accordance with example B.2.

FIG. 4 shows a picture of the porous spherical polymer particles produced in accordance with example B.3.

FIG. 5 shows a picture of the porous spherical polymer particles produced in accordance with example B.4.

The mean particle diameter and particle size distribution (CV) were determined using Coulter LS-230. CV is calculated by dividing the standard deviation (SD) by the mean particle diameter ($d_p$): $CV=(SD/d_p)*100\%$.

The specific surface area and pore volume were determined on the basis of $N_2$ adsorption/desorption and a Hg porosimeter. A porosimeter (Units 120 and 2000) from Carlo Erba was used for the Hg measurements. The pore volume for pores with a diameter under 50 Å and pores with a diameter under 5 Å was determined on the basis of $N_2$ adsorption/desorption using ASAP 2000 or Tristar 3000 from Micromeritics, USA.

EXAMPLES

A. Production of Start Particles by Dispersion Polymerisation

Start particles were produced by dispersion polymerisation of methyl methacrylate in methanol with polyvinyl pyrrolidone (PVP K-30) as the stabiliser. Either 2,2-azobisisobutyronitrile (AIBN) or dioctanoyl peroxide was used as the initiator.

The following standard recipe was used:

| Materials | Weight % |
| --- | --- |
| Methyl methacrylate | 10–15 |
| Methanol | 80–85 |
| PVP K-30 | 2.5–5 |
| AIBN | 0–0.4 |
| Dioctanoyl peroxide | 0–0.4 |
| Polymerisation temperature | 50–58° C. |

Depending on the exact recipe, spherical particles were produced in the size range 1–15 µm with a relatively narrow size distribution (CV 5–25%). When large start particles were produced, the size distribution was somewhat broader (CV 15–25%).

A constant polymerisation temperature was used throughout the polymerisation or the polymerisation temperature was controlled after the number of particles in the dispersion was constant (cf. patent NO 970247).

The following start particles were used for the production of large polymer particles with a narrow particle size distribution:

| Example | Particle diameter ($\mu$m) | CV (%) |
|---------|---------------------------|--------|
| A.1     | 6                         | 5      |
| A.2     | 14                        | 20     |
| A.3     | 7                         | 20     |

FIGS. 1 and 2 show pictures of the particles from examples A.1 and A.2 respectively.

B. One-Step Seed Polymerisation for the Production of Large Polymer Particles with a Narrow Particle Size Distribution

Example B.1

A solution of methyl hydroxy propyl cellulose (0.7 g), sodium lauryl sulphate (0.5 g) and water (750 g) was mixed with a solution of styrene (38.0 g), ethylene glycol dimethacrylate (38.0 g), pentyl acetate (38 g) and azobismethylbutyronitrile (1.0 g). The mixture was emulsified using Ultra Turrax high-speed mixer and added to a reactor (5 l steel reactor). An aqueous dispersion of polymethyl methacrylate (PMMA) start particles produced in accordance with example A.1 (5.0 start particles, 200 g water) and potassium iodide (0.2 g) were added to the reactor. The organic phase was left to swell into the start particles for 24 hours. Water (1500 g) was then added, after which the temperature was increased to 85° C. The polymerisation was completed in 7 hours at 85° C.

Porous spherical polymer particles with a mean diameter of 17 $\mu$m and a CV of 16% were obtained. The specific surface area was 63 $m^2$/g and the pore volume was 1.0 ml/g. The pore volume for pores with a diameter below 50 Å was 0.015 ml/g and for pores with a diameter less than 5 Å<0.001 ml/g.

Example B.2

A solution of methyl hydroxy propyl cellulose (0.7 g), sodium lauryl sulphate (0.5 g) and water (750 g) was mixed with a solution of methyl methacrylate (28 g), ethylene glycol dimethacrylate (84 g), pentyl acetate (48 g) and azobismethylbutyronitrile (1.0 g). The mixture was emulsified using Ultra Turrax high-speed mixer and added to a reactor (5 l steel reactor). An aqueous dispersion of PMMA start particles produced in accordance with example A.1 (5 g start particles, 174 g water) and potassium iodide (0.2 g) were added to the reactor. The organic phase was left to swell into the start particles for 2 hours. Water (1500 g) was then added, after which the temperature was increased to 80° C. The polymerisation was completed in 7 hours at 80° C.

Porous spherical polymer particles with a mean diameter of 18 $\mu$m and a CV of 20% were obtained; see FIG. 3. The specific surface area was 50 $m^2$/g and the pore volume was 0.4 $m^1$/g. The pore volume for pores with a diameter below 50 Å was 0.011 ml/g and for pores with a diameter less than 5 Å 0.004 ml/g.

Example B.3

A solution of methyl hydroxy propyl cellulose (0.14 g), sodium lauryl sulphate (0.10 g) and water (110 g) was mixed with a solution of methyl methacrylate (7.60 g), ethylene glycol dimethacrylate (7.60 g), pentyl acetate (16.80 g) and azobismethylbutyronitrile (0.15 g). The mixture was emulsified using Ultra Turrax high-speed mixer and added to a reactor (0.5 l double-walled glass reactor). An aqueous dispersion of PMMA start particles produced in accordance with example A.2 (0.5 g start particles, 1.2 g water) was added to the reactor. The organic phase was left to swell into the start particles for 48 hours. Water (300 g) and potassium iodide (0.04 g) were then added, after which the temperature was increased to 80° C. The polymerisation was completed in 7 hours at 80° C.

Porous spherical polymer particles with a mean diameter of 55 $\mu$m and a CV of 7% were obtained; see FIG. 4. The specific surface area was 63 $m^2$/g and the pore volume was 1.0 ml/g. The pore volume for pores with a diameter below 50 Å was 0.011 ml/g and for pores with a diameter less than 5 Å 0.001 ml/g.

Example B.4

A solution of methyl hydroxy propyl cellulose (0.14 g), sodium lauryl sulphate (0.10 g) and water (110 g) was mixed with a solution of styrene (7.60 g), ethylene glycol dimethacrylate (7.60 g), pentyl acetate (16.80 g) and azobismethylbutyronitrile (0.20 g). The mixture was emulsified using Ultra Turrax high-speed mixer and added to a reactor (0.5 l double-walled glass reactor). An aqueous dispersion of PMMA start particles produced in accordance with example A.2 (0.5 g start particles, 41.2 g water) was added to the reactor. The organic phase was left to swell into the start particles for 48 hours. Water (300 g) and potassium iodide (0.04 g) were then added, after which the temperature was increased to 80° C. The polymerisation was completed in 7 hours at 80° C.

Porous spherical polymer particles with a mean diameter of 50 $\mu$m and a CV of 9% were obtained; see FIG. 5. The specific surface area was 68 $m^2$/g and the pore volume was 1.0 ml/g. The pore volume for pores with a diameter below 50 Å was 0.017 ml/g and for pores with a diameter less than 5 Å<0.0001 ml/g.

Example B.5

A solution of methyl hydroxy propyl cellulose (0.14 g), sodium lauryl sulphate (0.10 g) and water (110 g) was mixed with a solution of methyl methacrylate (4.8 g), ethylene glycol dimethacrylate (14.4 g), pentyl acetate (12.8 g) and azobismethylbutyronitrile (0.20 g). The mixture was emulsified using Ultra Turrax high-speed mixer and added to a reactor (0.5 l double-walled glass reactor). An aqueous dispersion of PMMA start particles produced in accordance with example A.3 (1.0 g start particles, 41.6 g water) and potassium iodide (0.04 g) were added to the reactor. The organic phase was left to swell into the start particles for 2 hours. Water (300 g) was then added, after which the temperature was increased to 60° C. The polymerisation was completed in 7 hours at 60° C.

Porous spherical polymer particles with a mean diameter of 24 μm and a CV of 18% were obtained. The specific surface area was 129 m²/g and the pore volume was 0.7 ml/g. The pore volume for pores with a diameter below 50 Å was 0.045 ml/g and for pores with a diameter less than 5 Å<0.0001 ml/g.

What is claimed is:

1. A process for producing spherical polymer particles with a narrow size distribution, i.e. with a CV of less than 35%, and with a diameter in the range between 5 and 100 μm by seed polymerisation from start particles, which comprises performing the polymerisation using start particles which are produced by dispersion polymerisation, wherein the start particles comprise non-cross linked polymer particles having a swelling capacity above 5 times their own volume, and wherein monomers to be polymerised are added and swelled into the start particles directly and polymerised in one step to form the spherical polymer particles.

2. A process according to claim 1, wherein the monomers are added as a monomer mixture.

3. A process according to claim 1, wherein the monomer is a vinyl monomer or a vinyl monomer mixture.

4. A process according to claim 1, wherein the start particles absorb from 5 to 120 times their own volume of monomers.

5. A process according to claim 1, wherein one or more pore forming agents are added to the monomers to form spherical polymer particles having a porous structure with a very low content of pores with diameters less than 50 Å.

6. A process according to claim 2, wherein one or more pore forming agents are added to the monomer mixture to form spherical polymer particles having a porous structure with a very low content of pores with diameters less than 50 Å.

7. A process according to claim 1, wherein a polymerisation initiator is added to the monomers.

8. A process according to claim 2, wherein a polymerisation initiator is added to the monomer mixture.

9. A process according to claim 7, wherein the initiator is added separately before or after the addition of the monomers.

10. A process according to claim 1, wherein the monomers are added as emulsion droplets before they are swelled into the start particles.

11. A process according to claim 2, wherein the monomer mixture is added as emulsion droplets before they are swelled into the start particles.

12. A process according to claim 5, wherein the porous structure is free from micro pores with a diameter below 5 Å.

13. A process according to claim 1, wherein the polymerisation is performed in one step to form spherical polymer particles which have a narrower size distribution than the start particles.

* * * * *